United States Patent
Bauer et al.

(10) Patent No.: US 10,903,507 B2
(45) Date of Patent: Jan. 26, 2021

(54) METHOD FOR PRODUCING A FLOW PLATE FOR A FUEL CELL

(71) Applicant: Robert Bosch GmbH, Stuttgart (DE)

(72) Inventors: Harald Bauer, Ehningen (DE); Helerson Kemmer, Vaihingen (DE); Herbert Gruhn, Ludwigsburg (DE); Juergen Hackenberg, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 16/066,407

(22) PCT Filed: Dec. 2, 2016

(86) PCT No.: PCT/EP2016/079561
§ 371 (c)(1),
(2) Date: Oct. 18, 2018

(87) PCT Pub. No.: WO2017/114633
PCT Pub. Date: Jul. 6, 2017

(65) Prior Publication Data
US 2019/0081331 A1    Mar. 14, 2019

(30) Foreign Application Priority Data

Dec. 28, 2015 (DE) .................. 10 2015 226 753

(51) Int. Cl.
*H01M 8/0258* (2016.01)
*H01M 8/026* (2016.01)
(Continued)

(52) U.S. Cl.
CPC ......... *H01M 8/026* (2013.01); *H01M 8/0202* (2013.01); *H01M 8/0245* (2013.01);
(Continued)

(58) Field of Classification Search
CPC .. H01M 8/0258; H01M 8/026; H01M 8/0202; H01M 8/0245; H01M 8/0247
See application file for complete search history.

(56) References Cited

U.S. PATENT DOCUMENTS

2007/0243445 A1* 10/2007 Digiuseppe ......... H01M 8/0252
429/485
2009/0214926 A1* 8/2009 Watanabe ........... H01M 8/1018
429/514
2011/0065026 A1 3/2011 Shirvanian

FOREIGN PATENT DOCUMENTS

DE    19609133 C1    9/1997
DE    19835253 A1    1/2000
(Continued)

OTHER PUBLICATIONS

International Search Report with English translation and Written Opinion for Application No. PCT/EP2016/079561 dated Jan. 20, 2017 (15 pages).

*Primary Examiner* — Olatunji A Godo
(74) *Attorney, Agent, or Firm* — Michael Best & Friedrich LLP

(57) ABSTRACT

The invention relates to a method for producing a flow plate (10, 28) for a fuel cell (12), comprising a plurality of gas guide webs (14) and at least one electrically conductive and porous layer unit (16) arranged on the gas guide webs (14). It is proposed that a geometry and/or a structure of the layer unit (16) is produced during a material application onto the gas guide webs (14).

10 Claims, 1 Drawing Sheet

(51) Int. Cl.
   *H01M 8/04119*   (2016.01)
   *H01M 8/0202*    (2016.01)
   *H01M 8/0245*    (2016.01)
   *H01M 8/0247*    (2016.01)
   *H01M 8/1018*    (2016.01)

(52) U.S. Cl.
   CPC ..... *H01M 8/0247* (2013.01); *H01M 8/04156* (2013.01); *H01M 2008/1095* (2013.01)

(56) References Cited

FOREIGN PATENT DOCUMENTS

| | | |
|---|---|---|
| DE | 69901103 T2 | 11/2002 |
| DE | 112006000345 T5 | 4/2008 |
| DE | 102010045552 A1 | 4/2011 |
| JP | 107153469 A | 6/1995 |
| JP | 2001196076 A | 7/2001 |
| JP | 2005251676 A | 9/2005 |
| JP | 2007173230 A | 7/2007 |
| JP | 2008541377 A | 11/2008 |
| JP | 2011514640 A | 5/2011 |
| JP | 2011222130 A | 11/2011 |
| WO | WO2011030489 * | 3/2011 |
| WO | 2015101772 A1 | 7/2015 |
| WO | 2015103673 A1 | 7/2016 |

* cited by examiner

METHOD FOR PRODUCING A FLOW PLATE FOR A FUEL CELL

BACKGROUND OF THE INVENTION

A method for producing a flow plate for a fuel cell, with a plurality of gas guide ribs and with at least one porous, electrically conductive layer unit arranged on the gas guide ribs, has already been proposed.

SUMMARY OF THE INVENTION

The invention is based on a method for producing a flow plate for a fuel cell, in particular for a PEM fuel cell, with a plurality of gas guide ribs and with at least one porous, electrically conductive layer unit arranged on the gas guide ribs.

It is proposed that a geometry and/or a structure of the layer unit be generated during material application onto the gas guide ribs.

A "flow plate" should in particular be understood to mean a mechanical unit which is provided for in particular electrical contacting of at least one fuel cell and/or of at least two in particular adjacent fuel cells and/or for supplying a fuel cell with a fuel gas, in particular hydrogen and/or oxygen, and/or for disposal of at least one reaction product, in particular water and/or water vapor. The flow plate may in particular be configured as a monopolar plate, a bipolar plate or end plate. In particular, the flow plate may be formed at least substantially of an embossed metal sheet. "Provided" should be understood to mean in particular designed and/or equipped. Where an item is provided for a specific function, this should in particular be understood to mean that the item fulfills and/or performs this specific function in at least one application state and/or operating state. A "fuel cell" should be understood in particular to mean a unit which is provided to convert at least one chemical reaction energy of at least one, in particular continuously supplied, fuel gas, in particular hydrogen and/or carbon monoxide, and of at least one oxidizing agent, in particular oxygen, in particular into electrical energy. The gas guide ribs are in particular provided to form a flow field. A "flow field" should in this context be understood in particular to mean a three-dimensional structure which is applied in particular by a mechanical and/or chemical and/or optical method to at least one surface of the flow plate and/or introduced at least in part into a surface of the flow plate. In particular, the flow field takes up at least 30%, advantageously at least 50% and preferably at least 75% of the surface of the flow plate. In particular, the flow field is configured as a grid flow field and/or a channel flow field, which may in particular comprise a plurality of channels extending in particular at least substantially parallel to one another and/or at least one channel extending in serpentine manner.

A "layer unit" should be understood in this context in particular to mean a unit which comprises at least one layer formed of the electrically conductive material. In particular, the layer unit may have a plurality of layers arranged one above the other. In particular, the layer unit is configured to have at least substantially open porosity. In particular, the layer unit has a plurality of cavities which are connected in particular fluidically to one another and/or with a surrounding environment. The concept of "generating" a geometry and/or a structure of the layer unit during material application to the gas guide ribs should in particular be understood to mean that the final configuration of the layer unit, for example with regard to porosity, dimensions, number of layers, layer thickness of individual layers and/or total thickness of the layer unit is formed directly during an application process of the material forming the layer unit.

As a result of such a configuration, a method of this generic type may be provided with improved characteristics with regard to the manufacture of flow plates for fuel cells. In particular, local application of a material for producing a porous, electrically conductive layer unit on gas guide ribs may advantageously save material. Furthermore, the use of additional elements, in particular elements made from metal foams, which would have been applied to the gas guide ribs, may be dispensed with, so advantageously simplifying flow plate manufacture.

It is further proposed that the layer unit be applied at least in part to the gas guide ribs using a coating method. A coating method should be understood in particular to mean a chemical, mechanical, thermal and/or thermomechanical manufacturing process which is provided for application of an at least substantially adhesive layer of at least one amorphous substance to a surface of a workpiece. This enables advantageously simple and/or inexpensive production of the layer unit on the gas guide ribs.

In one configuration of the invention, it is proposed that the layer unit be applied at least in part to the gas guide ribs using a spray method. A "spray method" should in particular be understood to mean a method in which a coating material is accelerated in particular by means of a gas stream and applied to a workpiece. The layer unit is preferably applied at least in part to the gas guide ribs using a thermal spray method. A "thermal spray method" should be understood in particular to mean a method in which a coating material is fused or melted inside or outside a spray torch, accelerated in a gas stream in the form of spray particles and flung onto at least one surface of a workpiece to be coated. This allows advantageously simple and/or inexpensive production of the layer unit on the gas guide ribs.

It is further proposed that the layer unit be applied at least in part to the gas guide ribs using a 3D printing method. In this way, a layer element may advantageously be produced which has portions with different layer characteristics, for example in terms of strength, contact resistance and/or porosity.

It is additionally proposed to level out differences in height between the gas guide ribs during application of the layer unit. In particular, layers of different layer thickness may be applied to the gas guide ribs to level out differences in height. This allows advantageously low tolerance requirements when configuring the gas guide ribs. Furthermore, advantageous contactability may be achieved for the flow plate.

It is further proposed that catalyst particles be introduced at least into sub-regions of the layer unit. In particular, the catalyst particles may be introduced into the layer unit by means of a chemical and/or electrochemical method, for example by means of an electroplating method. This results in advantageous functionalization of the layer unit.

In addition, a flow plate is proposed for a fuel cell which has a plurality of gas guide ribs and at least one porous, electrically conductive layer unit applied to the gas guide ribs. The flow plate with applied porous, electrically conductive layer unit differs from known flow plates with elements of metallic foams arranged on gas guide ribs in particular in terms of a structure of the layer unit compared with the metallic foams and in terms of connection to surfaces of the gas guide ribs. In particular, the flow plate with an applied porous, electrically conductive layer unit has the advantage of less expensive and/or simpler manufacture compared with known flow plates with elements arranged on gas guide ribs.

Furthermore, a fuel cell, in particular a PEM fuel cell, is proposed with at least one membrane unit and at least one flow plate with a plurality of gas guide ribs and with at least one porous, electrically conductive layer unit arranged on the gas guide ribs, wherein the layer unit is arranged in a contact region between the membrane unit and the flow plate. In this way, fuel cell manufacture may be advantageously simplified and manufacturing costs advantageously reduced.

The method according to the invention is not here intended to be restricted to the above-described application and embodiment. In particular, to put into effect a mode of operation described herein, the method according to the invention may comprise a number of individual elements, components and units which differs from the number stated herein.

BRIEF DESCRIPTION OF THE DRAWINGS

Further advantages are revealed by the following description of the drawings. The drawings show an exemplary embodiment of the invention. The drawings, description and claims contain numerous features in combination. A person skilled in the art will expediently also consider the features individually and combine them into meaningful further combinations.

In the figures.

DETAILED DESCRIPTION

Figure 1:
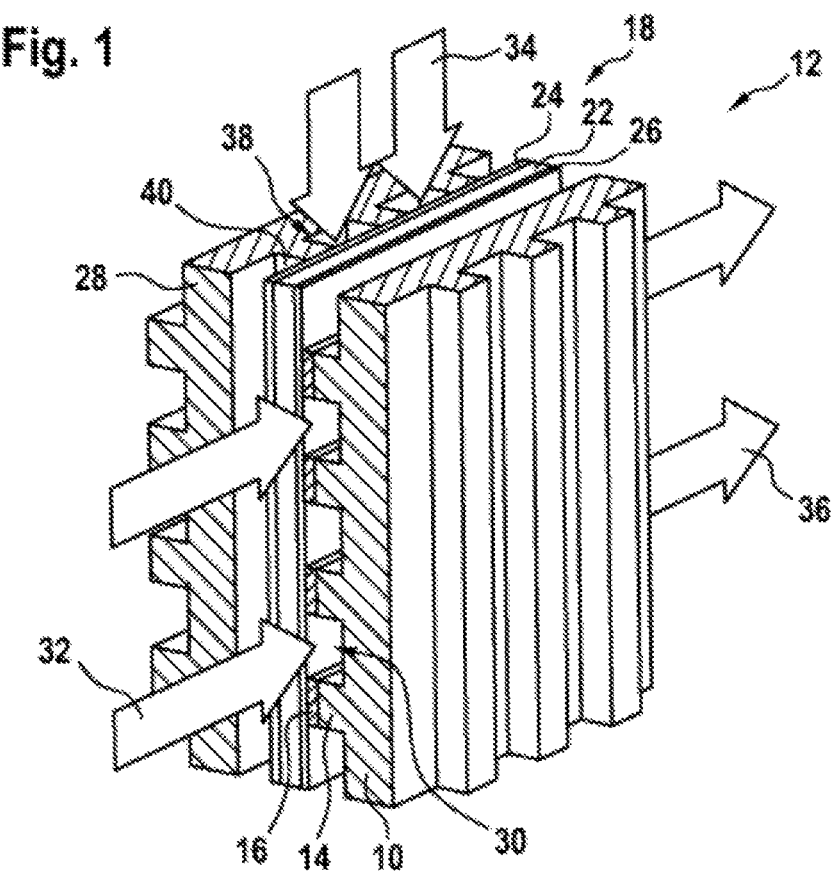
FIG. 1 is a schematic representation of a fuel cell with a membrane unit, a cathode-side flow plate and an anode-side flow plate

FIG. 1 is a schematic representation of a fuel cell 12. The fuel cell 12 has a membrane unit 18. The membrane unit 18 has a proton-conducting polymer membrane 22. The membrane unit 18 further has two diffusion layers 24, 26 which are arranged on either side of the polymer membrane 22. The diffusion layers 24, 26 are formed in particular of a woven carbon fabric covered with a catalytic material.

Furthermore, the fuel cell 12 has a cathode-side flow plate 10 and an anode-side flow plate 28. The membrane unit 18 is arranged between the cathode-side flow plate 10 and the anode-side flow plate 28. To produce electrical contact between the cathode-side flow plate 10 and the anode-side flow plate 28 via the membrane unit 18, the flow plates 10, 28 are pressed together with the membrane unit 18. The one anode-side flow plate 28 has a plurality of gas guide ribs 40 which form a plurality of gas channels 38 which are provided to feed a fuel gas 34, in particular hydrogen, to the membrane unit 18 on the anode side. The cathode-side flow plate 10 has a plurality of gas guide ribs 14 which form a plurality of gas channels 30 which are provided to feed oxygen 32, in particular atmospheric oxygen, to the membrane unit 18 on the cathode side and to remove water 36, in particular water vapor, arising during a reaction.

Figure 2:
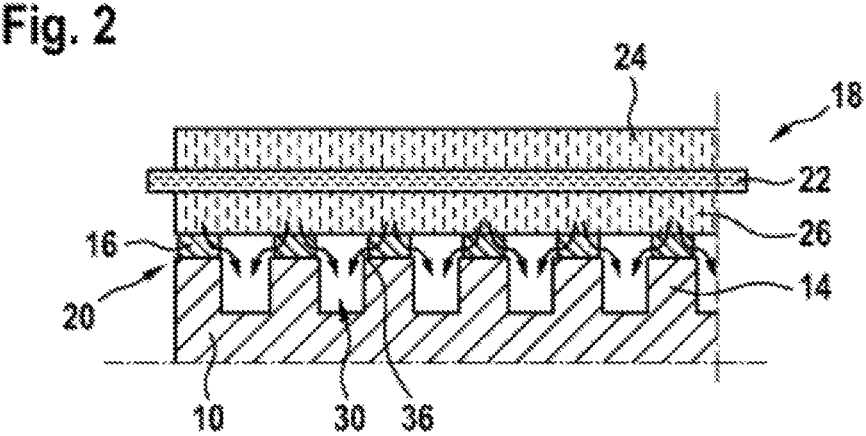
FIG. 2 is a sectional representation of the membrane unit and the cathode-side flow plate.

FIG. 2 is a sectional representation of the membrane unit 18 and the cathode-side flow plate 10 of the fuel cell 12. The flow plate 10 has a porous, electrically conductive layer unit 16 which has been applied to surfaces of the gas guide ribs 14. The layer unit 16 is arranged in a contact region 20 between the membrane unit 18 and the flow plate 10. As a result of the porous, electrically conductive layer unit 16, an advantageously electrical connection may be achieved, and water 36 may be advantageously guided out of the cathode-side diffusion layer 26 in the region of the gas guide ribs 14.

When manufacturing the cathode-side flow plate 10, a geometry and/or a structure of the layer unit 16 may be generated directly during material application onto the gas guide ribs 14. The layer unit 16 is applied at least in part to the gas guide ribs 14 using a coating method. The layer unit 16 is applied at least in part to the gas guide ribs 14 using a spray method, preferably using a thermal spray method. Alternatively or in addition, the layer unit 16 may be applied at least in part to the gas guide ribs 14 using a 3D printing method. During application using a 3D printing method, the layer unit 16 may be applied in such a way that sub-regions of the layer unit 16 differ from one another in particular in terms of strength, contact resistance and/or a porosity. During application of the layer unit 16, differences in height between the gas guide ribs 14 may moreover be leveled out. After application of the layer unit 16, catalyst particles may be introduced at least into sub-regions of the layer unit 16, whereby a local reaction rate of the fuel cell 12 may be advantageously increased. The anode-side flow plate 28 may be manufactured identically to the cathode-side flow plate 10.

What is claimed is:

1. A method for producing a flow plate (10, 28) for a fuel cell (12), the flow plate (10, 28) having a plurality of gas guide ribs (14) extending therefrom with at least one porous, electrically conductive layer unit (16) arranged on the gas guide ribs (14), the method comprising:
   providing the gas guide ribs (14), and
   thereafter generating a geometry and/or a structure of the layer unit (16) during application of the at least one porous, electrically conductive layer unit (16) onto the gas guide ribs (14),
   characterized in that during application of the layer unit (16) differences in height between the gas guide ribs (14) are leveled out by applying a different layer thickness of the layer unit (16) to each of the gas guide ribs (14), and
   characterized in that catalyst particles are introduced at least into sub-regions of the layer unit (16).

2. The method as claimed in claim 1, characterized in that the layer unit (16) is applied at least in part to the gas guide ribs (14) using a coating method.

3. The method as claimed in claim 1, characterized in that the layer unit (16) is applied at least in part to the gas guide ribs (14) using a spray method.

4. The method as claimed in claim 1, characterized in that the layer unit (16) is applied at least in part to the gas guide ribs (14) using a thermal spray method.

5. The method as claimed in claim 1, characterized in that the layer unit (16) is applied at least in part to the gas guide ribs (14) using a 3D printing method.

6. A method for providing a fuel cell, the method comprising
   providing at least one membrane unit (18),
   providing at least one flow plate (10, 28), the flow plate (10, 28) having a plurality of gas guide ribs (14) and with at least one porous, electrically conductive layer unit (16) arranged on the gas guide ribs (14),
   wherein the flow plate (10, 28) is produced by generating a geometry and/or a structure of the layer unit (16) during application of the at least one porous, electrically conductive layer unit (16) onto the gas guide ribs (14), and arranging the at least one flow plate (10, 28) such that the layer unit (16) contacts the membrane unit (18), characterized in that during application of the layer unit (16) differences in height between the gas guide ribs (14) are leveled out by applying a different layer thickness of the layer unit (16) to each of the gas guide ribs (14), and characterized in that catalyst particles are introduced at least into sub-regions of the layer unit (16).

7. The method as claimed in claim 6, characterized in that the layer unit (16) is applied at least in part to the gas guide ribs (14) using a coating method.

8. The method as claimed in claim 6, characterized in that the layer unit (16) is applied at least in part to the gas guide ribs (14) using a spray method.

9. The method as claimed in claim 6, characterized in that the layer unit (16) is applied at least in part to the gas guide ribs (14) using a thermal spray method.

10. The method as claimed in claim 6, characterized in that the layer unit (16) is applied at least in part to the gas guide ribs (14) using a 3D printing method.

* * * * *